United States Patent [19]
Boos et al.

[11] Patent Number: 6,074,555
[45] Date of Patent: Jun. 13, 2000

[54] MODIFIED CHROMATOGRAPHIC SUPPORT MATERIALS

[75] Inventors: Karl Siegfried Boos, Gauting; Andreas Walfort, Warburg; Friedhelm Eisenbeiss, Weiterstadt; Dieter Lubda, Bensheim, all of Germany

[73] Assignee: Merck Patent Gesellschaft mit Beschrankter Haftung, Germany

[21] Appl. No.: 08/415,766

[22] Filed: Apr. 3, 1995

Related U.S. Application Data

[63] Continuation of application No. 08/111,963, Aug. 26, 1993, abandoned, which is a continuation of application No. 07/943,793, Sep. 11, 1992, abandoned.

[30] Foreign Application Priority Data

Sep. 13, 1991 [DE] Germany .............................. 41 30 475

[51] Int. Cl.⁷ .................................................. B01D 15/08
[52] U.S. Cl. ..................................... 210/198.2; 210/502.1; 210/635; 210/656; 502/402
[58] Field of Search ............................ 210/198.2, 502.1, 210/635, 656; 502/401, 402, 404

[56] References Cited

U.S. PATENT DOCUMENTS

| | | | |
|---|---|---|---|
| 3,901,763 | 8/1975 | Horiuchi | 435/815 |
| 4,330,440 | 5/1982 | Ayers | 210/198.2 |
| 4,544,485 | 10/1985 | Pinkerton et al. | 210/502.1 |
| 4,694,092 | 9/1987 | Takahata et al. | 556/400 |
| 4,773,994 | 9/1988 | Williams | 210/198.2 |
| 4,778,600 | 10/1988 | Williams | 210/198.2 |
| 4,782,040 | 11/1988 | Revis | 210/198.2 |
| 4,855,054 | 8/1989 | Williams | 530/417 |
| 4,941,974 | 7/1990 | Williams | 210/198.2 |
| 4,950,634 | 8/1990 | Williams | 210/198.2 |
| 4,950,635 | 8/1990 | Williams | 210/198.2 |
| 5,041,226 | 8/1991 | Shibata | 210/502.1 |
| 5,110,784 | 5/1992 | Williams | 210/198.2 |
| 5,135,649 | 8/1992 | Kanda | 210/502.1 |
| 5,137,627 | 8/1992 | Feibush | 210/198.2 |

FOREIGN PATENT DOCUMENTS

| | | | |
|---|---|---|---|
| 0 173 233 | 3/1986 | European Pat. Off. | 210/198.2 |
| 0 295 809 | 12/1988 | European Pat. Off. | 210/198.2 |

OTHER PUBLICATIONS

Hackh's Chemical Dictionary, Fourth Edition, 1972, McGraw Hill, p. 703.

Crigee et. al. Sauerstoff—Verbindungen III, pp. 543, 544, 547 & 548 (1952).

Shielded hydrophobic phase: a new concept. for direct injection analysis of biological fluids by high–performance liquid chromatography, D.J. Gisch et al., Journal of Chromatography, vol. 433, pp. 264–268, 1988.

Kirk–Othmer Encyclopedia of Chemical Technology, Kirk et al., vol. 9, pp. 291 and 300–302, 1980.

Abstract, Glunz et al., Paper No. 490, Pittsburgh Conference, 1990, one sheet.

Internal–Surface Reversed–Phase Silica Support for Direct Injection Determination of Drugs in Biological Fluids by Liquid Chromatography, Haginaka et al., Anal. Chem., vol. 61, pp. 2445–2448, 1989.

Extended Life for Blood Serum Analysis Columns Using Dual Zone Chromatographic Materials, D.E. Williams, Anal. Chem, vol. 62, pp. 807–810, 1990.

Drug determination in serum by liquid chromatography with restricted access stationary phases, J. Haginaka, Trends in Analytical Chemistry, vol. 10, No. 1, pp. 17–22, 1991.

*Primary Examiner*—Ernest G. Therkorn
*Attorney, Agent, or Firm*—Millen, White, Zelano & Branigan, P.C.

[57] ABSTRACT

The invention relates to improved chromatographic support materials, to the preparation thereof and to the use thereof as sorbent for chromatography. The particles of these materials have hydrophobic surfaces consisting of fatty acid esters in the pores and hydrophilic outer surfaces. The materials according to the invention permit direct separation of protein-containing samples by means of reverse phase methods.

10 Claims, 5 Drawing Sheets

MODIFIED CHROMATOGRAPHIC SUPPORT MATERIALS

This application is a continuation of application Ser. No. 08/111,963 filed Aug. 26, 1993, now abandoned, which is a continuation of application Ser. No. 07/943,793 filed Sep. 11, 1992, also abandoned.

SUMMARY OF THE INVENTION

The invention relates to improved chromatographic support materials, to the preparation thereof and to the use thereof as sorbents in chromatography. The particles of these materials have hydrophobic surfaces in the pores and hydrophilic outer surfaces.

Preferably employed for the HPLC determination of low molecular weight substances in biological materials and body fluids, for example blood serum or plasma, or urine, are reverse phase packing materials. Time-consuming, costly and labor-intensive sample-pretreatment steps are necessary because otherwise on direct injection of protein-containing samples the proteins would be denatured and accumulate on the chromatographic support materials. This would irreversibly damage the chromatography column. For this reason, it is necessary to remove the proteins quantitatively before the analysis, whether by precipitation, membrane filtration and/or liquid-liquid or liquid-solid phase extraction. This complication applies to important determinations which are carried out in very large numbers; these include determinations of pharmaceuticals and their metabolites (therapeutic drug monitoring; checks on doping), as well as determinations of endogenous substances (clinical chemical analysis) and of xenobiotics (biological monitoring).

This is why there have been attempts recently to prepare porous support materials which, simultaneously with a selective retention of low molecular weight analytes (molecular weight<5000 Dalton), make possible quantitative separation of proteins and other macromolecular components in a directly injected sample. Support materials of this type have diffusion barriers which make only a restricted distribution phase or surface accessible to macromolecular compounds. The shielding can be brought about by chemical and/or physical effects; a variety of proposed methods for this have been published recently:

Shielded Hydrophobic Phase, SHP: D. J. Gisch, B. T. Hunter and B. Freibush, J. Chromatogr. (1988) 433, 264;

Semipermeable Surface, SPS: L. J. Glunz, et al., Paper No. 490, Pittsburgh Conference, 1990;

Internal Surface Reversed Phase (or ISRP): Th. C. Pinkerton, H. I. Hagestam U.S. Pat. No. 4,544,485, 1985, EP 0 173 233, 1989;

J. Haginaka et al., (1989) Anal. Chem 61, 2445–2448;

Dual Zone, DZ: D. E. Williams, P. M. Kabra, (1990) Anal. Chem. 62, 807;

Restricted Access Stationary Phases, RASP: J. Haginaka, (1991) Trends in Analytical Chemistry 1, 17.

The materials and processes of U.S. Pat. No. 4,544,485 (EP 0 173 233 corresponding thereto) and Haginaka et al. (1989) are associated with a variety of disadvantages which will be explained in detail hereinafter.

Chromatographic support materials according to EP 0173 233 have narrow pores as physical diffusion barriers which prevent the penetration of serum or plasma proteins to the hydrophobic phase. These pores have diameters of 8 nm or less. The outer surfaces of the particles are hydrophilic, whereas oligopeptides which contain hydrophobic amino acids are bound to the inner surfaces.

These materials are prepared from glycerol-derivatized silica gel by, for example, chemical bonding of the tripeptide glycyl-phenylalanyl-phenylalanine via the amino terminus by means of 1,1-carbonyldiimidazole to the diol groups of the glycerol radical. The phenylalanine residues located on the outer surface are subsequently eliminated enzymatically; carboxypeptidase A is preferred for the elimination. However, in this case the glycine residues remain essentially bonded to the support. For this reason this support material has negatively charged carboxyl groups on the outer surface and, in particular, also inside the pores (C-terminal phenylalanine). It therefore does not have the required pure reverse phase properties. Furthermore, this cation exchanger property on the outer surface results in unwanted interactions with the sample material.

According to the technical teaching of EP 0 173 233, peptides are regarded as essential as hydrophobic phase for the effectiveness of the support materials.

Peptides have in every case hydrophilic structures in the main chain and, as a rule, ionic end groups. This is why no separations based on ion-pair chromatography are possible with the support materials according to EP 0 173 233. This type of reverse phase chromatography has proved particularly suitable for HPLC analysis of drugs and their metabolites. Furthermore, the use of oligopeptides as stationary phase in reverse phase chromatography is unusual so that current analytical methods must be modified.

Peptides are considerably more space-filling as hydrophobic phase than are the alkyl radicals otherwise customary in reverse phase chromatography. This is why the surface density with the hydrophobic phase which can be achieved for the support materials according to EP 0 173 233 is low. For this reason, the columns packed with materials according to this state of the art have low binding capacities. The amount of substance to be fractionated and the sample volume are subject to severe restrictions.

Overall, the hydrophobicity of the reverse phases which can be achieved with peptides is lower than that which can be achieved with conventional alkylation.

Haginaka et al. (1989) disclose a chromatographic support material in which the hydrophobic phase consists of fatty acid residues in amide linkages. The amide linkage is regarded by the authors as sufficiently stable for the intended use. However, the preparation of the material is more complicated than that of the material according to EP 0 173 233: a specific new enzyme, polymyxin acylase, which is difficult to obtain, is required to remove the fatty acid residues from the outer surfaces. It is not, for example, commercially available. In addition, the enzymatic elimination results in free amino groups which must be converted in an additional reaction into a "diol" phase in order to avoid disturbances.

Thus, there is a lack of support materials for the chromatographic separation tasks described in the introduction, which materials allow protein-containing samples to be loaded on directly but which also have good binding capacities and a high degree of hydrophobicity, comparable with that of alkylated phases, and which are easy to prepare.

An object of the invention, therefore, is to provide chromatographic support materials with properties of these above-mentioned types and processes for the preparation thereof.

Upon further study of the specification and appended claims, further objects and advantages of this invention will become apparent to those skilled in the art.

It has been found, surprisingly, that chromatographic support materials of the above types can be prepared by, for example, reacting silica gel particles, which have been modified by known processes with 2,3-dihydroxypropoxy groups (—O—CH$_2$—CHOH—CH$_2$OH; "diol" group), in a further step with fatty acid derivatives to form an ester linkage. Subsequently, the acyl groups on the outer surface are eliminated enzymatically using esterases and/or lipases. Surprisingly, even particle-bound lipase is suitable for this reaction. This results in stable support materials. This finding is surprising in view of the technical teaching of Haginaka et al., because the ester linkage is even more unstable than the amide linkage. The material according to the invention is easier to prepare compared with the state of art, because easily obtainable enzymes can be employed, and because the required "diol" phase is produced on the surface without additional reaction.

The invention thus relates to a packing material for liquid chromatography, based on porous materials which contain hydroxyl groups and have fatty acid residues as reverse phases which are contained in the inner surfaces of the pores, characterized in that the fatty acid residues are present as ester linkages. The outer surfaces of the particles are hydrophilic.

It is possible to use porous silicate-containing materials as starting material, for example silica gels or porous glasses. Large numbers of materials of these types are commercially available: for example Nucleosil™, supplied by Macherey & Nagel, Düren; LiChrospher®, supplied by E. Merck, Darmstadt; or Controlled-Pore Glass™, supplied by Electro-Nucleonics Inc., U.S.A.; Bioran® glass, supplied by Schott, Mainz. These materials can be converted, for example by known methods, into the appropriate "diol" phases, i.e. 2,3-dihydroxypropoxy-modified supports (Dean, P. D. G., Johnson, W. S., Middle, F. A., Affinity Chromatography, 1985, IRL-Press, England).

However, finished "diol" phases which can be employed according to the invention as hydrophilic supports are also commercially available; for example LiChrospher® diol (supplied by E. Merck, Darmstadt).

Furthermore, polymers or copolymers containing hydroxyl groups are likewise suitable as starting material for the sorbents according to the invention; materials of these types are also commercially available: for example TSK-Gel®, supplied by Toyo Soda, Japan; Eupergit®, supplied by Röhm-Pharma, Weiterstadt. In general, all hydrophilic porous materials which have a sufficient density of hydroxyl groups (i.e. about 2–6 $\mu$mol/m$^2$) are suitable as starting material for the chromatographic support materials according to the invention.

According to the invention, the fatty acid residues are derived from saturated and/or unsaturated fatty acids with an even or odd number of carbon atoms. The number of C atoms can be chosen appropriate for the required degree of hydrophobicity between 2 and 24 in analogy to the customary methods for chromatography on reverse phases. These residues are preferably straight-chain, but compounds with branched chains are also suitable. The residues of butyric acid ($C_4$), of caprylic acid ($C_8$) and of stearic acid ($C_{18}$) are particularly preferred.

According to the invention, esterification is accomplished on aliphatic hydroxyl groups, not on, e.g., silanol groups. Therefore, "diol" derivatization or introduction of aliphatic hydroxyl groups is necessary unless the base material contains already aliphatic hydroxyl groups. Any aliphatic hydroxyl group could be used as an alcohol moiety for forming the $C_2$–$C_{10}$ alkyl having 1–9 aliphatic hydroxyl groups. A preferred range would be $C_2$–$C_6$ alkyl having 1–5 aliphatic hydroxyl groups, e.g., 2-hydroxyethoxy-, 2-hydroxypropoxy-, 3-hydroxypropoxy-, 2,3-dihydroxypropoxy-, 4-hydroxy-n-butoxy-, 3-hydroxy-n-butoxy-, 3,4dihydroxy-n-butoxy-, 2,3-dihydroxy-n-butoxy-, 2,3,4-trihydroxy-n-butoxy-, especially preferred is 2,3-dihydroxypropoxy-.

The invention furthermore relates to a process for the preparation of packing materials for liquid chromatography with reverse phases which are restricted to the inner surfaces of porous particles and consist of fatty acid residues, with the following process steps:

a) introduction of aliphatic hydroxyl groups, where not yet present in the starting material, into the support material;

b) esterification of the aliphatic hydroxyl groups with fatty acids, with the entire inner and outer surfaces of the particles being covered;

c) enzymatic hydrolysis of the fatty acid esters located on the outer surfaces.

Suitable for introducing the aliphatic hydroxyl groups are mono-, di- and trifunctional silanes as well as mixtures thereof. A silica gel support with homogeneous distribution of silanol groups on the surface, which has been reacted with mono- and/or difunctional silanes to give the corresponding "diol" phase, is preferred. Preferred as starting material for the subsequent reaction are materials which contain silanol groups (silica gels, porous glasses) and which have 2–6 $\mu$mol/m$^2$, preferably 2.5–3.5 $\mu$mol/m$^2$, "diol" groups on the phase surface.

Fatty acid derivatives suitable for the esterification are known to the person skilled in the art: these include the corresponding anhydrides, azides, halides and, in particular, the chlorides of the acids. The chlorides of butyric acid ($C_4$), of caprylic acid ($C_8$) and of stearic acid ($C_{18}$) are preferred.

This involves the primary and/or secondary hydroxyl group of the immobilized glycerol radical ("diol" radical) forming the corresponding ester with the halide in a known manner.

The reaction of the "diol"-containing support materials with the fatty acid halides described is carried out with a 4- to 10-fold, preferably 8- to 9-fold, excess of chloride based on the "diol" content of the materials employed. The reaction is normally carried out in the presence of 1 to 3 equivalents of an organic base, preferably 1.5 equivalents of triethylamine, in an anhydrous solvent, for example chloroform. After dropwise addition of the cooled halide at 0–10° C., preferably 4° C., the mixture is left to react at 20–25° C. for 12 to 15 hours. The resulting material is filtered off, washed several times with chloroform, methanol, water and subsequently again with methanol and dried.

The fatty acid derivatives are otherwise prepared by methods known per se, as are described in the literature (for example Houben-Weyl, Methoden der Organischen Chemie (Methods of Organic Chemistry), Georg-Thieme Verlag, Stuttgart; see, especially, Volume III, pages 543–544 and 547–548), specifically under reaction conditions as are known as suitable for the said reactions. It is also possible to make use of variants which are known per se and are not detailed here for this.

The $C_4$-, $C_8$- and $C_{18}$-fatty acid ligands which are preferably used occupy between 60 and 90%, preferably 80%, of the surface, based on the "diol" content of the starting material in each case.

In a further step according to the invention the mono- and diacyl esters located on the outer surface of the particles are cleaved enzymatically by ester-cleaving enzymes such as lipases (EC 3.1.1.3) or esterases (EC 3.1.1.1). Porcine pancreatic lipase type II is preferably employed.

In the case of support materials which have a median pore diameter of less than 8 nm it is possible to carry out the enzymatic hydrolysis with soluble enzymes because these are substantially excluded from the interior of the pores.

In a particularly preferred embodiment of the invention, enzymes which have been bound to particles are employed for eliminating the fatty acid residues located on the outside. For this purpose, for example, esterases or lipases are covalently bonded by methods known from the literature (Affinity Chromatography, 1985, IRL-Press Ltd., England), for example to agarose gel. It is surprising that enzyme preparations of this type are suitable because it is generally assumed that particle-bound enzymes attack macromolecular substrates only poorly or not at all.

The use of particle-bound enzymes allows variants of the process in which the enzyme can easily be recovered. Employed for binding the enzymes for this purpose are, for example, carrier materials with magnetic properties, such as, for example, Magnogel™ A4R or Magnogel™ AcA 44 (L'Industrie Biologique Français). After the fatty acid residues located on the outside of the chromatographic support material have been eliminated enzymatically it is possible for the immobilized enzyme to be removed from the reaction mixture with the aid of a magnet and to be reused.

The use according to the invention of particle-bound enzymes is also advantageous in cases in which a chromatographic support material with relatively large pores (>8 nm) is required. It is similarly advantageous to use particle-bound enzymes when the pore size has a wide distribution. In these cases there is successful prevention of the enzymes penetrating into a considerable portion of the pores and, as a consequence, eliminating in an unwanted manner the fatty acid residues located on the inner surface of the pores.

If agarose gel is used as carrier for the enzymes, it can be dissolved after the enzymatic reaction by heating to 60° C. and/or by treating with denaturing or chaotropic compounds (for example urea, guanidinium hydrochloride, salts of thiocyanic acid). The solubilized enzyme preparation can subsequently be removed from the reaction mixture by filtration.

The enzymatic hydrolysis of the fatty acid esters located on the outer surface of the chromatographic supports is carried out, for example, by incubation of 1 g of the particular fatty acid-modified support material with 2,000 to 8,000 enzyme units, preferably 5,000 units, of the particular dissolved or carrier-bound lipase or esterase in a buffer at pH 6 to pH 8, preferably pH 7.1, for 60 to 90 hours at 37° C.

The material obtained after the enzymatic reaction is filtered off and washed several times with buffer, sodium chloride solution (1 mol/liter) and water. When a dissolved enzyme is used it is possible subsequently to dry the chromatographic support material. When a lipase or esterase immobilized on agarose is used, the resulting material is first resuspended in 20 parts by weight of water and heated at 60° C. preferably for 2 hours. It is subsequently filtered off, washed several times with sodium chloride solution (1 mol/liter), water and methanol and dried.

The fatty acid ligands occupying the surface before and after the enzymatic treatment can be determined by elemental analysis and/or commercially available enzymatic assays for free fatty acids (for example supplied by Boehringer, Mannheim, Germany).

The proportion removed from the outer surface of the chromatographic support material is typically 10 to 20% when soluble lipases or esterases are used and 1 to 5% when carrier-bound lipases or esterases are used, based on the total occupation of the surface.

The invention furthermore relates to a method for the chromatographic separation of mixtures of substances, characterized in that a chromatographic packing material whose porous particles have on their inner surfaces reverse phases consisting of fatty acid esters is used.

The invention finally relates to a method for sample preparation for biological samples, characterized in that concomitant interfering macromolecular substances are removed using a material whose porous particles have on their inner surfaces reverse phases consisting of fatty acid esters.

The chromatographic support materials prepared according to the invention with reverse phase properties confined to the interior of the pores and with hydrophilic outer surface are outstandingly suitable as packing materials for chromatography, especially for the direct injection, preparation and analysis of protein-containing samples by column chromatography.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

Figure 1A:
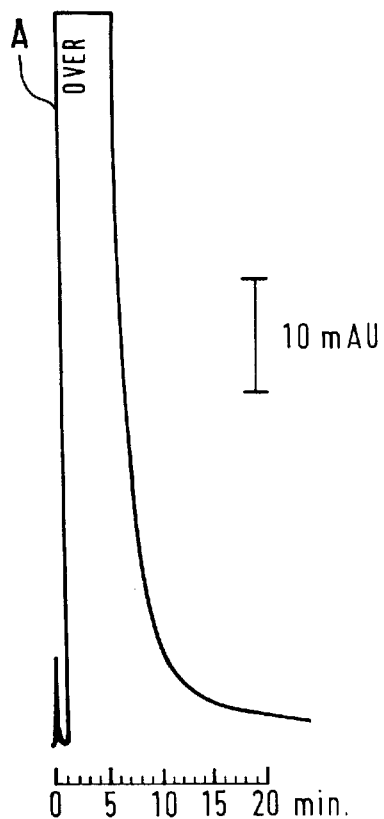
FIGS. 1A and 1B are protein elution profiles (for details see Example 5)

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application German P 41 30 475.6, filed Sep. 13, 1991, are hereby incorporated by reference.

EXAMPLES

The preparation of the chromatography materials according to the invention is described by way of example hereinafter but this description is not to be regarded as a restriction on the subject matter of the invention. The advantages compared with the ISRP packing materials currently known from the state of the art are evident from the reported examples of use.

Example 1

Preparation of a chromatographic support material with $C_{18}$-alkanoyl chains on the inner surface of the pores starting from silica gel which has been modified with 2,3-dihydroxypropoxy groups 1.1. Epoxidation 10 g of LiChrospher® Si (spherical silica gel with a specific surface area of 350 m$^2$/g, a particle size of 12 µm and a median pore diameter of 7 nm) are suspended in 50 ml of toluene. 2.6 ml (corresponding to 3 µmol/m$^2$) of glycidyloxypropylmethyldimethoxysilane are added and the mixture is then boiled under reflux with stirring for 5 hours. The material is filtered off, washed with toluene and methanol and dried.

1.2. Ring Opening to Give the "Diol" Phase

The product from 1.1. is suspended in 50 ml of aqueous sulfuric acid solution (5% by weight) and boiled under reflux while stirring slowly for 3 hours. The reaction product is subsequently filtered off, washed with water until free of sulphate, washed with methanol and dried.

A diol-modified silica gel with a covering of 2.79 µmol/m$^2$ (calculated from the content of 7.0% C).

1.3. Reaction with Stearoyl Chloride 1 g of the support material obtained in 1.2. is suspended in 5 ml of anhydrous chloroform at 4° C. in a three-neck flask with stirrer and thermometer, and 11.7 mmol of cooled triethylamine are added.

7.8 mmol of stearoyl chloride which is dissolved in 5 ml of cooled chloroform are added dropwise and then the suspension is stirred at 20° C. for 24 hours.

The resulting material is washed twice each with 20 ml of chloroform, methanol, water and finally again with methanol each time and dried.

Calculation of the $C_{18}$-alkanoyl chains (stearoyl groups) occupying the total surface on the basis of elemental analysis gives a value of 1.98 µmol/m$^2$.

1.4. Enzyme-catalyzed Elimination with Lipase 1 g of the material obtained in 1.3. is mixed with 50 mg of porcine pancreatic lipase type II, corresponding to 5,000 enzyme units (supplied by Sigma Chemie, Munich, Germany), which have been dissolved in 20 ml of a buffer (2 mM tris-HCl, 1 mM $CaCl_2$, 7 mM NaCl, pH 7.1). This mixture is left to react at 37° C. with shaking for 72 hours. The resulting material is filtered off, washed successively twice each with 30 ml of the above buffer, with sodium chloride solution (1 mole/liter), water and methanol each time and dried. Calculation of the $C_{18}$-alkanoyl chains occupying the inner surface after the enzymatic elimination on the basis of elemental analysis yields a value of 1.68 µmol/m$^2$.

1.5. Enzyme-Catalyzed Elimination with Particle-Bound Lipase 1 g of the material obtained in 1.3. is mixed with 5,000 enzyme units of a wheat germ lipase (type I-A, bound to crosslinked (4%) agarose; cat. no. L 2764; supplied by Sigma Chemie, Munich, Germany) which have been suspended in 20 ml of a buffer (2 mM tris-HCl, 1 mM $CaCl_2$, 2 mM NaCl, pH 7.1). This mixture is left to react at 37° C. while shaking for 72 hours. The resulting material is filtered off and washed successively twice each with 30 ml of the above buffer, with sodium chloride solution (1 mole/liter) and water each time. The resulting material is resuspended in 20 ml of water and heated at 60° C. while shaking for two hours. The material is subsequently filtered off, washed successively twice each with 30 ml of sodium chloride solution (1 mole/liter), water and methanol each time and dried. Calculation of the internal occupation with $C_{18}$-alkanoyl chains after the enzymatic elimination on the basis of elemental analysis gives a value of 1.90 µmol/m$^2$.

Example 2

Preparation of a chromatographic support material with $C_8$-alkanoyl chains on the inner surface of the pores starting from silica gel which has been modified with 2,3-dihydroxypropoxy groups.

The preparation of this material is carried out in analogy to the process described under 1.1. to 1.5., employing capryloyl chloride in place of stearoyl chloride.

Example 3

Preparation of a chromatographic support material with $C_4$-alkanoyl chains on the inner surface of the pores starting from silica gel which has been modified with 2,3-dihydroxypropoxy groups.

The preparation of this material is carried out in analogy to the process described in 1.1. to 1.5., employing butyryl chloride in place of stearoyl chloride.

Example 4

Capacity Factors (k')

The capacity factors (k') for theophylline and for phenytoin were determined for various packing materials (see Examples 1 to 3); these were also determined for a material according to the state of the art (EP 0 173 233) for comparison.

The packing material according to the invention was investigated before (line A) and after (line B) elimination of the acid residues located on the outside.

Materials prepared by hydrolysis with particle-bound lipase (see Example 1.5.) showed no essential difference in their chromatographic properties from those prepared using dissolved lipase (see Example 1.4.).

The capacity factor (k') is calculated in the following way:

$$k' = (t_R - t_M)/t_M$$

with $t_R$=retention time of the analyte, $t_M$=retention time of the mobile phase.

The chromatographic conditions were: column dimensions: 30×4 mm I.D.; mobile phase: water; flow rate: 0.5 ml/min; detection: UV 271/205 nm; theophylline (9.2 µg/ml); phenytoin (5 µg/ml); volume injected: 100 µl.

Comparative Investigation (*)

The chromatographic conditions in the comparative investigation were as follows: Mobile phase: 85% (v/v) 0.1 M $K_2HPO_4$ buffer, pH 6.8, 10% (v/v) isopropanol, 6% (v/v) tetrahydrofuran; flow rate: 1 ml/min.

The k' for elution of phenytoin from the ISRP column described in EP 0 173 233 (GFF-S 5-80, Regis Chemical Company, Morton Grove, Ill., U.S.A.) under these chromatographic conditions is only 11.36. This material thus has a capacity factor which is less than half the capacity factor for the material according to the invention.

Results

| Packing material | | Capacity factors | |
|---|---|---|---|
| | | Theophylline | Phenytoin(*) |
| C-18 (stearoyl) | A | 20.7 | >>30 |
| | B | 18.9 | >>30 26.3 |
| C-8 (capryloyl) | A | 3.2 | >30 |
| | B | 2.5 | >30 24.5 |
| C-4 (butyryl) | A | 0.0 | 20.6 |
| | B | 0.0 | 18.6 16.0 |

Example 5

Protein Elution Profile

500 µl of human serum were loaded on under the following chromatographic conditions:

Packing material according to Example 1; column dimensions: 10×4 mm I.D.; mobile phase: water; flow rate: 0.5 ml/min; detection: UV 280 nm.

Figure 1B:
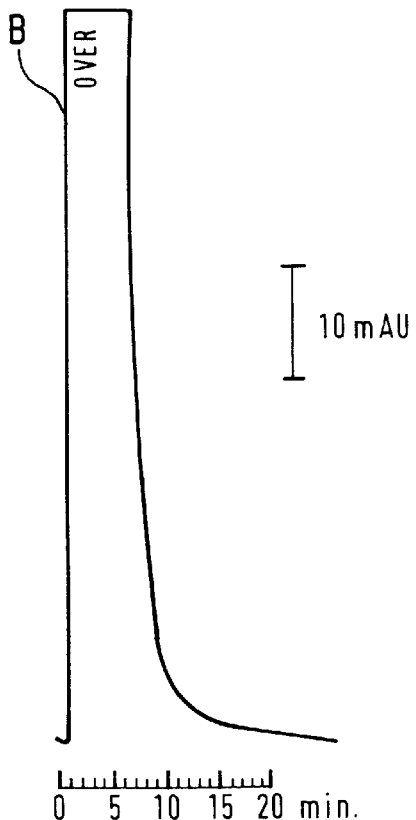

The results are to be found in FIG. 1: FIG. 1A shows the elution profile for the first injection, FIG. 1B for the tenth injection.

Materials prepared by hydrolysis with particle-bound lipase (see Example 1.5.) showed no essential difference in their chromatographic properties from those prepared using dissolved lipase (see Example 1.4.).

Example 6

Protein Recovery

500 µl of human serum were loaded on several times under the chromatographic conditions as described in Example 5; the recovery of the serum proteins in the eluate was measured by colorimetric protein determination by the biuret method.
Results

| Number of injection | Recovery (%) |
|---|---|
| 1 | 99.6 |
| 2 | 102.3 |
| 3 | 98.5 |
| 4 | 101.5 |
| 5 | 99.7 |

Example 7

Direct injection with integrated sample preparation for the analysis of phenytoin in human plasma A) Design of Apparatus The design of the apparatus is evident from FIG. 2; the specific meanings of the identifiers in the figure are as follows:

1: precolumn buffer
2: analysis buffer
3: HPLC pump (L-6000)
4: HPLC pump (L-6200)
5: automatic sample loader (AS-4000)
6: automatic reversing valve (ELV-7000)
7: precolumn
8: analytical column
9: detector
10: integrator (D-2500)
11: waste (Apparatus supplied by E. Merck, Darmstadt, Germany)

B) Settings of the Automatic Reversing Valve (6)

Figure 2:
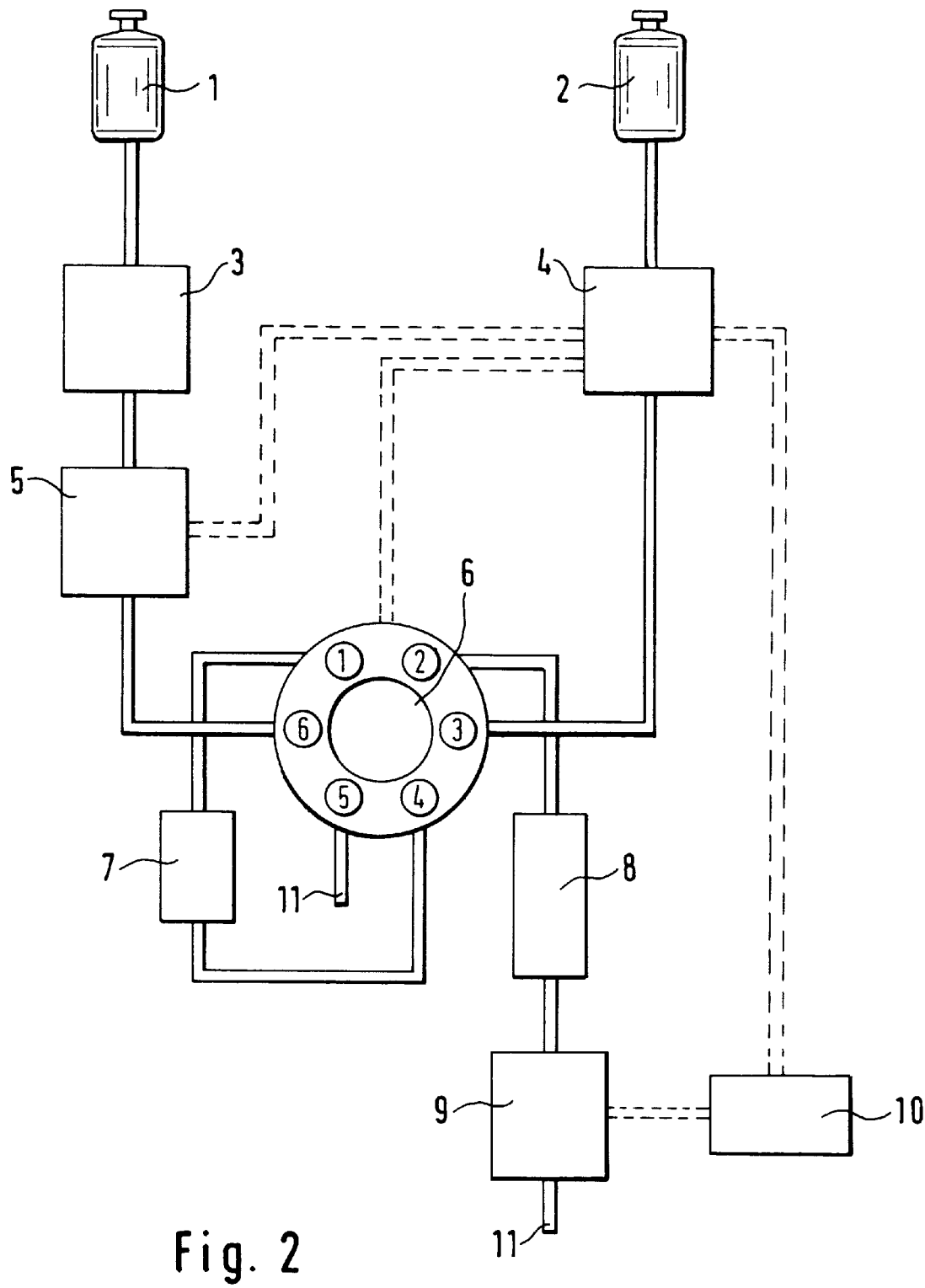
FIG. 2 is a design of apparatus (for details see Example 7)
Figure 3A:
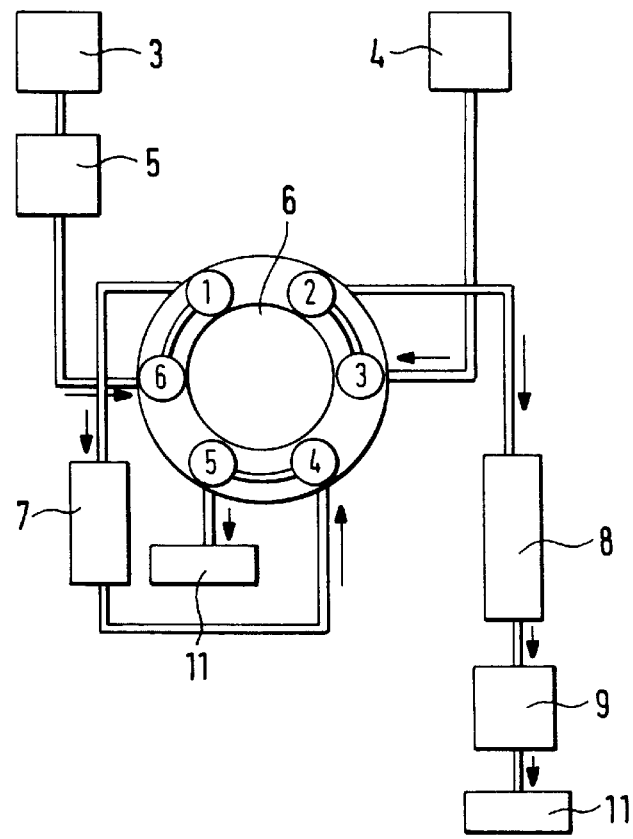
FIGS. 3A and 3B are settings of the automatic reversing valve (for details see Example 7)
Figure 3B:
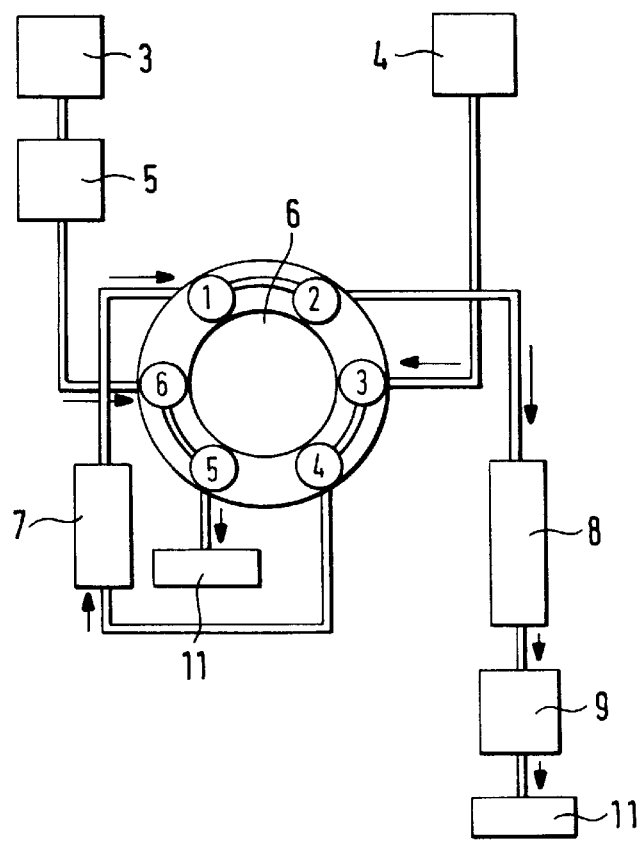

The line connections between the units in FIG. 2 as are set depending on the setting of the reversing valve are evident from FIG. 3:
FIG. 3a: "LOAD" setting
FIG. 3b: "INJECT" setting C) Chromatographic Conditions Precolumn: as in Example 1; column dimensions: 30×4 mm I.D.; precolumn buffer: 0.05 M $NaH_2PO_4$, pH 4.0; analytical column: LiChrospher® 60 RP-select B, 5 µm, 125×4 mm I.D.; analysis buffer: 0.05 m $NaH_2PO_4$; pH 4.0/water/acetonitrile (40:40:30, V:V:V); detection: UV 205 nm.

D) Fully Automatic Analysis Cycle

After injection of the plasma sample (100 µl) by the automatic sample loader (5) in the "LOAD" setting of the reversing valve (6), the sample is transferred with the aid of the precolumn buffer (1; flow rate: 0.5 ml/min) transported by the HPLC pump (3) onto the precolumn (7) containing the sorbent according to the invention. The analyte (phenytoin) is selectively retained on the precolumn (7) owing to the properties according to the invention, while the remaining biological matrix (proteins etc.) is passed directly and quantitatively to the waste (11) within 12 min.

After the valve (6) has been reversed to the "INJECT" setting, the analyte is eluted with the aid of the analysis buffer (2; flow rate: 0.8 ml/min), which is transported by the HPLC pump (4), completely from the precolumn (7) in 5 min and transferred to the downstream analytical column (8).

After the valve (6) has been reversed to the "LOAD" position, the analytical separation takes place under isocratic conditions (flow rate: 0.8 ml/min). The eluted compounds are measured in the detector (9), and the data are evaluated in the integrator (10). At the same time the precolumn is conditioned by means of the pump (3) for a new analysis cycle.

E) Result of analysis

Figure 4:
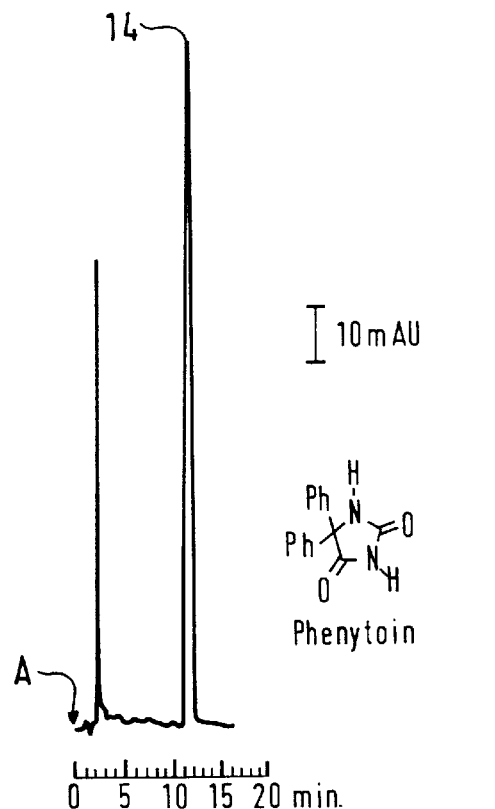
FIG. 4A and 4B are elution diagrams (for details see Example 7)
Figure 4:
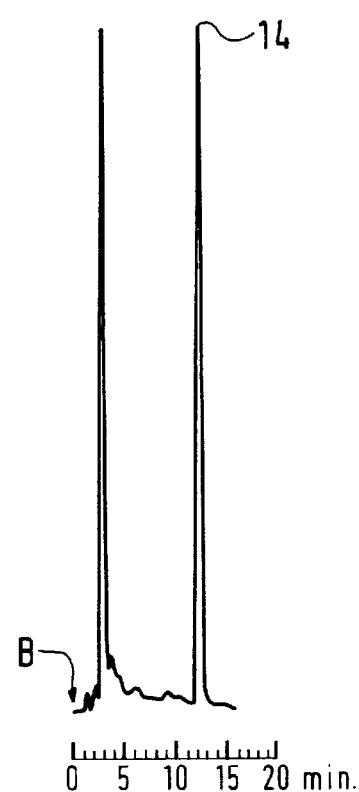

FIG. 4 contains the resulting elution diagrams for:
FIG. 4A: the calibrator (1 µg of phenytoin; 14)
FIG. 4B: human plasma (100 µl) containing 1 µg of phenytoin (14)

Example 8

Direct injection with integrated sample preparation; separation in the ion-pair mode: analysis of tryptophan metabolites in human serum The design of the apparatus and the settings of the automatic reversing valve are identical to those in Example 7.

C) Chromatographic Conditions

Precolumn: as in Example 1; column dimensions: 30×mm I.D.; precolumn buffer: 0.1 M $NaH_2PO_4$, 5 mM octane-1-sulphonic acid, pH 4.0; analysis buffer: 0.1 M $NaH_2PO_4$, 5 mM octane-1-sulphonic acid, 20% (v/v)

acetonitrile, pH 6.0; detection: fluorescence, excitation 300 nm, emission 350 nm.

D) Fully Automatic Analysis Cycle

After injection of the serum sample (100 μl) by the automatic sample loader (5) in the "LOAD" position of the electrical reversing valve (6), the sample is transferred by the precolumn buffer (1; flow rate: 0.5 ml/min) which is transported by the HPLC pump (3) onto the precolumn (7) containing the sorbent according to the invention. The analyte 5-hydroxyindoleacetic acid is electrically neutral under the chosen pH conditions (pH 4.0), while the analyte 5-hydroxytryptamine (serotonin) has a positive charge which is balanced by addition of a lipophilic ion-pair reagent (octane-1-sulphonic acid). Both analytes are thus able to be retained selectively on the precolumn (7) under ion-pair chromatographic conditions, whereas the remaining biological matrix (proteins etc.) is transferred directly and quantitatively to the waste (11) within 12 min. After the valve (6) has been reversed to the "INJECT" setting, the analytes are completely eluted from the precolumn (7) within 3 min by the analysis buffer (2; flow rate: 1 ml/min), which is transported by the HPLC pump (4), as a consequence of the increased pH (pH 6.0) and the content of organic solvent (20% acetonitrile, v/v) and transferred to the downstream analytical column (8).

After the valve (6) has been reversed to the "LOAD" setting, the analytical separation takes place under isocratic conditions (flow rate: 0.8 ml/min). The eluted compounds are measured in the detector (9), and the data are evaluated in the integrator (10). At the same time the precolumn is conditioned with the aid of the pump (3) for a new analysis cycle.

E) Result of Analysis

Figure 5A:
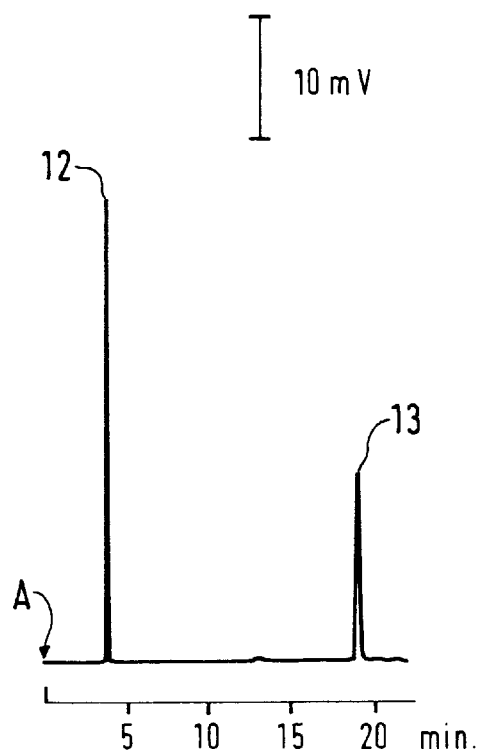
FIGS. 5A and 5B are elution diagrams (for details see Example 8).
Figure 5B:
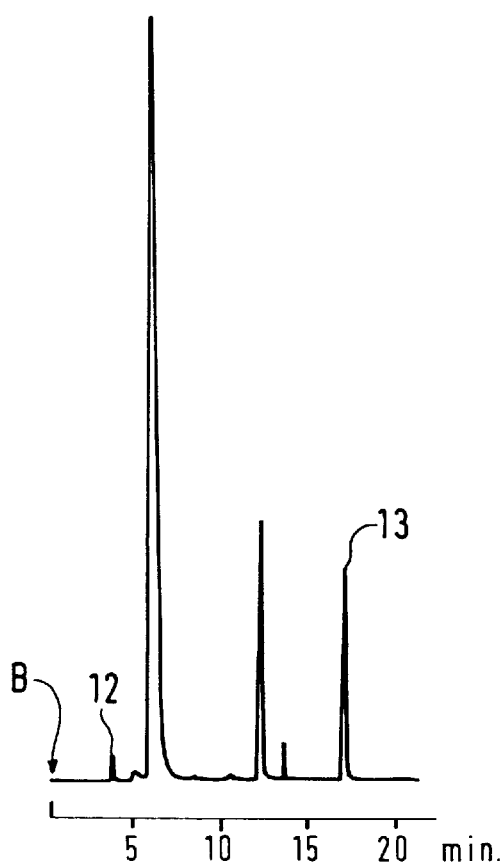

FIG. 5 contains the resulting elution diagrams for:
FIG. 5A: calibrator:
(12) 5-hydroxyindoleacetic acid, 66.8 pmol
(13) 5-hydroxytryptamine, 80.2 pmol
FIG. 5B: human plasma (100 l) containing:
(12) 5-hydroxyindoleacetic acid, 4.0 pmol
(13) 5-hydroxytryptamine, 89.6 pmol The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An internal surface reverse phase packing material for liquid chromatography, comprising a porous particle support having an outer surface and an inner reverse-phase surface, wherein fatty acid residues are attached through an ester bond between a fatty acid and an aliphatic hydroxyl group to form said inner reverse-phase surface.

2. The packing material according to claim 1, wherein the outer surface of the porous particle support is essentially free of fatty acid residues bonded through ester linkages.

3. The packing material according to claim 1, wherein the porous particles are a silica gel to which 2,3-dihydroxypropoxy groups are attached.

4. The packing material according to claim 1, wherein the porous particles are a glass to which 2,3-dihydroxypropoxy groups are attached.

5. The packing material according to claim 1, wherein the porous particles are an organic polymer or copolymer containing hydroxyl groups.

6. The packing material according to claim 1, wherein said ester linkages are between said fatty acid residues and aliphatic hydroxyl groups.

7. The packing material according to claim 6, wherein said aliphatic hydroxyl group is 2-hydroxyethoxy-, 2-hydroxypropoxy-, 3-hydroxypropoxy-, 4-hydroxy-n-butoxy-, 3-hydroxy-n-butoxy-, 3,4-dihydroxy-n-butoxy-, 2,3-dihydroxy-n-butoxy-, or 2,3,4-trihydroxy-n-butoxy.

8. The packing material according to claim 1, wherein said fatty acid residues are butyric acid, caprylic acid, or stearic acid.

9. The packing material according to claim 1, wherein said porous particle support has a median pore diameter of about 8 nm or less.

10. The packing material according to claim 1, wherein said porous particle support has a median pore diameter of greater than 8 nm.

* * * * *